United States Patent [19]
Smith et al.

[11] 3,915,043
[45] Oct. 28, 1975

[54] CABLE OR OTHER LINE CUTTING DEVICES

[75] Inventors: William Ronald Smith, Vermont; Sydney Langford Howlett, Templestowe, both of Australia

[73] Assignee: The Commonwealth of Australia, Australia

[22] Filed: Feb. 25, 1974

[21] Appl. No.: 445,464

[30] Foreign Application Priority Data
Mar. 2, 1973  Australia............................ 2462/73

[52] U.S. Cl. ...................... 83/362; 83/370; 83/580; 83/639; 114/221 A
[51] Int. Cl.²....................... B26D 5/08; B26D 5/38
[58] Field of Search ............ 83/370, 372, 639, 580, 83/362; 114/221 A; 89/1 B

[56] References Cited
UNITED STATES PATENTS

| | | | |
|---|---|---|---|
| 2,335,952 | 12/1943 | Martin .............................. | 83/639 X |
| 2,396,707 | 3/1946 | Kurtz .............................. | 114/221 A |
| 2,420,987 | 5/1947 | Temple, Jr. ...................... | 83/639 X |
| 3,760,674 | 9/1973 | Temple et al. ................... | 83/639 X |
| 3,780,689 | 12/1973 | Giebel et al. ................... | 114/221 A |
| 3,817,200 | 6/1974 | Hess et al. ...................... | 114/221 A |

*Primary Examiner*—Frank T. Yost
*Attorney, Agent, or Firm*—McGlew and Tuttle

[57] ABSTRACT

A CABLE CUTTING DEVICE for mounting upon a crop-dusting aircraft to sever electric cables in the event of collision therewith includes a guide for guiding a cable into a cutting zone, and a trigger actuated by the cable entering the cutting zone and operable to activate an explosively driven blade to sever the cable in the cutting zone.

9 Claims, 5 Drawing Figures

U.S. Patent  Oct. 28, 1975  3,915,043
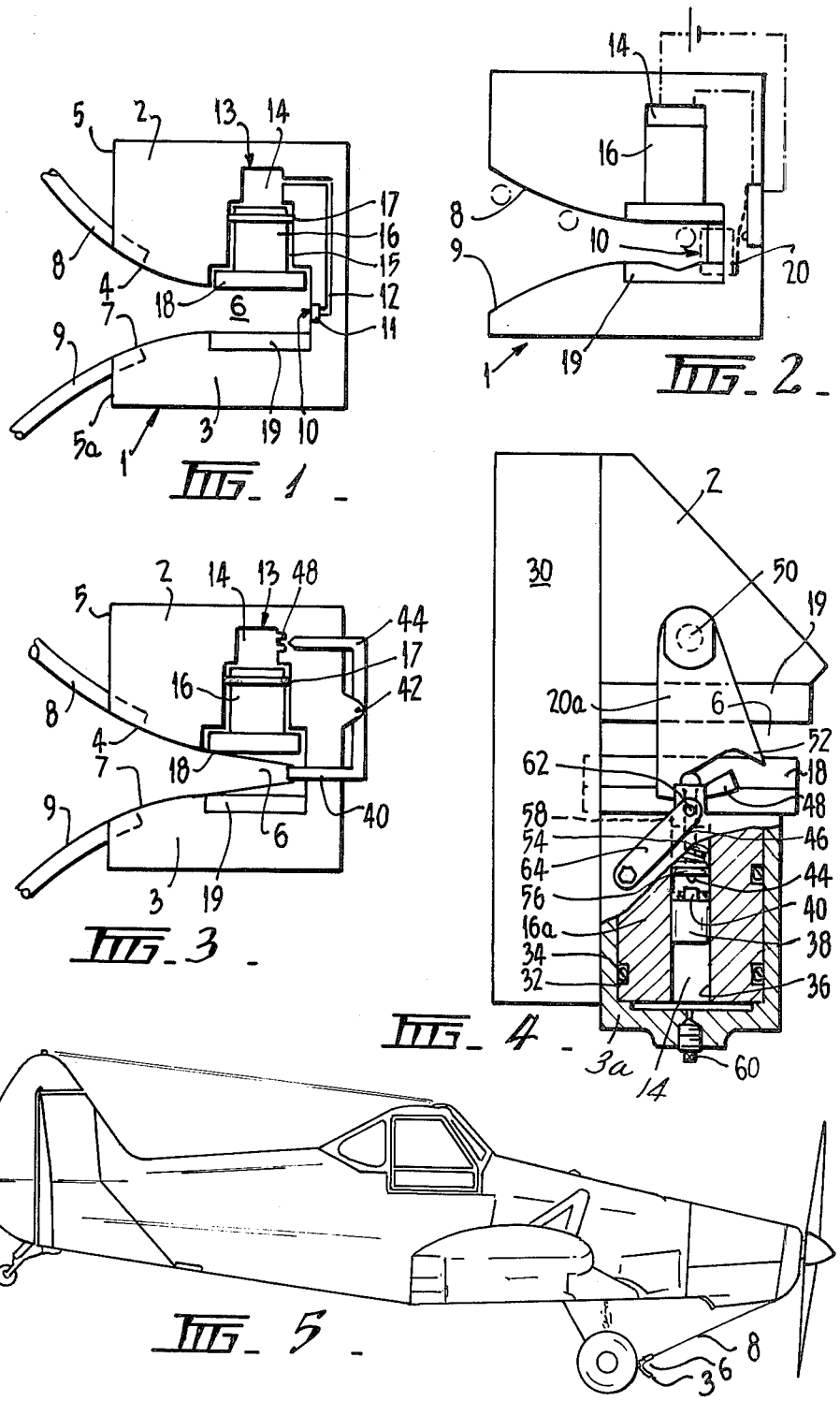

CABLE OR OTHER LINE CUTTING DEVICES

FIELD AND BACKGROUND OF THE INVENTION

This invention relates to cable or other line cutting devices and, in particular, to devices that are operable to sever cables or other lines when there is relative bodily motion between the cutter and the line. Such a device would be especially useful mounted on an agricultural aircraft to sever power or telephone cables in the event that the aircraft should inadvertently strike them.

The problem of serious accidents caused by aircraft colliding with unseen electrical power lines and telephone wires is increasing with greater activity over rural areas. Attempts have been made to overcome this wire strike problem by making the wires more conspicuous. Such attempts have, however, not been significantly successful and the problem still accordingly remains.

SUMMARY OF THE INVENTION

One object of this invention is to provide a means for reducing the likelihood of an accident occurring when an aircraft inadvertently strikes power lines or telephone cables.

Another object is the provision of improved cable cutting devices which may be fitted on an aircraft in order to sever an essentially horizontally oriented aerial cable or wire with which the aircraft may happen to come into contact while in flight, thereby greatly reducing the likelihood of the occurrence of a serious accident.

Other objects and features of the invention will be apparent from the ensuing description.

According to the present invention, there is provided a device for severing a line when there is relative bodily movement between the device and the line, the said device comprising guide means for guiding a line to a cutting zone, trigger means which are actuated in response to the presence of a line in the zone and severing means operable on actuation of the trigger means to sever the line in the zone.

Normally, the line, an electric power cable for example, is suspended to extend essentially between two fixed points and the device is mounted on an aircraft. The device may, however, also find use when fitted to land vehicles or to vessels.

Preferably, the line severing device comprises a barrel, a charge of explosive material which can be initiated by the trigger means, and a cutting element mounted within the barrel, the cutting element being accelerated towards the line in the cutting zone on initiation of the charge to sever the line.

The guide means preferably includes a pair of guides which are convergent towards the cutting zone such that a line, on contact with one of the guides, will slide therealong into the cutting zone.

Preferably, the guides are formed as edges of a pair of coplanar plate portions. These portions may be part of a single plate. Also, the barrel preferably is mounted on one of the plate portions while the other plate portion carries an anvil to serve as a reaction surface for the cutting element to facilitate severing of the line.

The trigger means preferably comprises a switch or explosive device at the inner end of the cutting zone remote from the guide means, and is actuated when the line makes contact therewith. Where the trigger means comprises a switch, actuation thereof can be arranged to initiate the charge electrically.

Where the trigger means comprises an explosive device, it is normally mounted in a passage which communicates with the charge so that heat and pressure generated by actuation of the explosive device causes initiation of the charge. Preferably, the passage is formed in such one of the pair of plate portions.

The guide means may further include elongate members such as rods which project from the pair of plate portions and form extensions of same.

When the device is fitted to an aircraft, it is preferably mounted on a forward wheel strut and one of the rods extends from the underside of the fuselage, close to the nose of the aircraft, to one of the plate portions. The other rod may depend from the other plate portion and project forwardly and downwardly to a point just below the center line of the wheel on the strut. Normally, of course, there are two forward wheel struts and two devices with elongate rods or like extensions are required.

To provide for the possibility of an aircraft striking a group of spaced lines, the trigger means may include means to provide a delay, say of 0.15 sec., between the time when the first line contacts the trigger means and the time when the charge is initiated so that a second or third line may enter the cutting zpne before the cutting element operates to sever all lines in the cutting zone simultaneously. Where such strikes are anticipated, it may be desirable to sheath the device with insulating material. Alternatively, several devices may be provided, successive lines being severed by different devices.

The invention further embraces the severing of a line which is fixed at each end relative to a datum, and which comprises guiding the line into a cutting zone which is moving bodily relative to the datum and initiating an explosive charge when the line is in the zone, to sever the line.

Preferably, the line activates trigger means upon entry into the cutting zone and the trigger means, upon actuation, initiates the explosive charge which is arranged to drive a cutting element into the cutting zone to sever the line.

BRIEF DESCRIPTION OF THE DRAWINGS

The invention will now be further described with reference to the accompanying drawings, in which:

FIG. 1 shows a side view of one form of cutting device according to the present invention;

FIG. 2 shows a modification of the device illustrated in FIG. 1

FIG. 3 shows another modification of the device illustrated in FIG. 1;

FIG 4 shows another modified form of the invention; and

FIG. 5 shows a light aircraft fitted with a device according to the present invention.

DESCRIPTION OF THE PREFERRED EMBODIMENTS

The device shown in FIG. 1 comprises a guide plate indicated generally by the reference numeral 1, the plate having an upper portion 2 and a lower portion 3. The upper portion 2 has a curved guide surface 4 which curves from an upper front peripheral edge 5 towards a cutting zone 6. The lower portion 3 has a curved guide surface 7 which curves from a lower front peripheral edge 5a towards the cutting zone 6. As will be seen in the drawing, the guide surfaces 4 and 7 converge towards the cutting zone 6.

Projecting forwardly beyond the front peripheral edges 5, 5a of the device are respective upper and lower guide rods 8 and 9. The guide rods 8 and 9 are affixed to the respective and lower portions 2 and 3 so that they respectively form continuations of the associated guide surfaces 4 and 7. The guide rods illustrated in FIG 1 are shown truncated but, in practice, their length and the distance between their front ends will be governed by the intended use of the device.

The arrangement described above is such that, if the device is mounted on a moving body and encounters an electrical power line or the like, the line will come into contact with one of the guide rods 8, 9, will slide therealong and then, via one of the guide surfaces 4, 7, slide into cutting zone 6.

As the device continues to move forward relative to the line, the line will strike a trigger region 10 located in the rear of the cutting zone 6. In the embodiment shown in FIG 1, a trigger in the form of a percussion primer 11 is provided and is disposed such that the line will cause initiation of the explosive device on impact therewith. The device 11 is mounted in a discharge passage 12 which communicates with a chamber 13 which harbors an explosive charge 14. The high temperature and pressure of gases released from the primer 11 upon actuation wil be transmitted through the passage 12 to the chamber 13 whereupon the explosive material 14 will be initiated. The lower end of the chamber 13 is in communication with a firing barrel 15 which houses a cutting member 16. The cutting member 16 is slidably mounted in the barrel 15 and an annular sealing element 17 is provided near the upper end of the cutting member 16 to provide a substantially gas-tight seal with the barrel 15.

The lower end of the cutting element 16 is provided with a cutting edge 18 which normally forms an upper peripheral wall of the cutting zone 6. Upon initiation of the explosive material 14, the cutting element 16 is driven downwardly so that the cutting edge 18 will be driven through the cutting zone 6 into engagement with an anvil or reaction surface 19 which usually forms a lower peripheral wall of the cutting zone 6. Any cable or like line that is present in the cutting zone 6 at the time the cutting edge 18 passes through the cutting zone will be severed.

To provide for the possibliity that an aeroplane carrying the device may encounter an number of closely spaced lines, the device can be modified so that it will sever all the lines simultaneously. This mode of operation is effected by providing a time delay between the time at which the first of the lines strikes the trigger region 10 and the time at which the explosive charge 14 is initiated so that there will be time for all of the lines in the group to enter into the cutting zone 6 before the cutting edge 18 or similar means operates to cut all the lines simultaneously.

It is to be noted that the lower plate portion 3 and anvil or reaction surface 19 are not strictly necessary for severing lines in the cutting region 6 as the cutting edge 18 or other severing means may have sufficient energy to be driven through any line in its path without the necessity for a reaction surface.

In an alternative arrangment for severing all cables within a group of spaced cables, a number of cutting devices can be positioned in staggered relationship on an aeroplane or other moving body so that cables, as they are encountered, are successively severed by the various cutting devices. With such an arrangement it may be desirable to arrange for the lower portion of a device to be dislodged immediately after it has been involved in the severing of a cable so that further cables are not held within its cutting zone after its explosive charge has been initiated.

Referring now to FIG 2, the device illustrated therein is essentially the same as that described previously and like components have been denoted by the same reference numerals. In this modification, the trigger region 10 includes a trigger element 20 which is movable upon impact with the line. Movement of the trigger element 20 is transferred to an electrical micro-switch which is arranged to electrically initiate the charge of explosive material 14. The device illustrated in FIG. 2 will normally sever a cable within 0.15 seconds after the cable has entered the trigger region 10.

The device shown in FIG. 3 is similar to that shown in FIG. 1 except for the mode of initiating the explosive charge 14. In this arrangement, a cable within the cutting zone 6 will strike one arm 40 of a mechanical trigger which is provided to the upper portion 2 at 42. Another arm 44 of the trigger is provided with a firing tip 46 which will strike a primer 48 when a cable strikes the arm 40. The primer 48 initiates the charge 14 to operate the device as described previously.

The device illustrated in FIG 4 operates upon the same principles as those described already but differs in its structural detail. The device is partly broken away to reveal its internal construction and the guide rods 8 and 9 have been omitted for simplicity.

In this arrangement the device includes a mounting bracket 30 onto which is mounted the upper portion 2 of the plate. The lower portion is replaced by a cylindrical member 3a which is also mounted upon the bracket 30. The cutting member 16a is piston-like and is movable axially within the member 3a. The cutting member includes a pair of circumferencial grooves 32 within which are located O-rings 34 to seal against the interior of the member 3a.

The cutting member 16a includes a central, axial bore 36 the lower end of which houses the propellent charge 14. Located above the charge is a delay ignitor 38 and a percussion primer 40 for initiating the main charge 14 with an appropriate delay. Mounted above the primer 40 is a striker pin having a head 44 axially aligned with the primer 40 and a shaft 46 which extends beyond the bore 36 into the cutting region 6 and is mounted over an arm 48 of a trigger element 20a. The trigger element 20a is pivotally connected to the plate 2 at 50 and includes a striking face 52 located beside but spanning the edge 18 and anvil 19. On operation of the device a cable will engage the striking face 52 and cause the trigger 20a to rotate (clockwise as seen in the drawing), whereupon the arm 48 will disengage the upper end of the shaft 46 of the striker pin. In the arrangement shown, the shaft 46 is encircled by a compression spring 54 which extends between a washer 56 mounted adjacent to its head 44 and shoulder 58 of the bore 36. The spring may be pre-compressed and thus force the head 44 of the pin into engagement with the percussion initiated primer 40 or, alternatively, may be uncompressed and be compressed immediately prior to operation; for instance, by inclining the arm 48 upwards whereby the shaft 46 must move upwards on the arm 48 before it can be released therefrom. In another alternative arrangement, the striker pin could be arranged to be directly driven into the primer 40 by the cable.

Initiation of the primer 40 will then cause initiation of the pyrotechnic ignitor 38, the purpose of which is to provide a delay between contact with a first cable and operation of the device to thereby enable further cables in a group of cables to enter the cutting region 6 so that all cables will be cut simultaneously. The actual delay chosen will depend upon a number of factors such as (a) the expected speed of the aircraft, (b) expected number of cables in the group and (c) separation of cables within the group. A delay of 150 milliseconds would by typical.

After the appropriate delay, the igniter 38 will initiate the main charge 14 causing the piston-like cutting member 16a to be rapidly moved upwards and sever the cable(s) in the manner described previously. After operation, gases trapped between the end of the cylindrical member 3a and the cutting member 16a can be released by unscrewing a release plug 60. Unwanted movement of the cutting member 16a is prevented by shear pins, one of which is shown by the reference numeral 62, which extend through the member 3a and overlie the upper face of the member 16a. Each pin 62 is retained in position by a respective clip 64 fastened to the exterior of the member 3a. When the charge 14 has been initiated the shear pins 62 are sheared-off by the member 16a.

FIG. 5 shows a typical light aircraft of a type which is suitable for use in agricultural crop spraying or dusting. It has been found that with aircraft of this general shape, the area of contact with suspended cables that is most serious is that region between the nose of the aircraft and the wheel struts. If an aircraft strikes a cable in this region, the cable will be trapped by the wheel strut and the forward pull of the propeller will cause the aircraft to pivot about the cable and crash into the ground. Crashes arising in this way are very serious indeed. If the aircraft strikes a cable at a point above the level of its nose, then the cables will be deflected over the aircraft and any pivoting about the cable will cause the plane to travel upwards and therefore out of immediate danger of plummeting to the ground.

According to the invention, a device of the type described above is mounted on each of the forward wheel struts of the aircraft. Preferably, each device is positioned such that the cutting zone is at about the same height as the center of the wheel on the strut, but having the trigger region somewhat forwardly of the axis of the wheel. Each upper guide rod 8 preferably extends to a point just below the nose of the aircraft while the lower guide rods 9 project downwardly and forwardly to a point beneath the centreline of the wheels.

With such an arrangement, if the aircraft should happen to strike a cable in the critical region, the cable will slide along one of the guide rods into the cutting zone 6 where it will be severed.

If more than two cables could come into contact with the aircraft at the one time, then it may be desirable to sheath or manufacture some components of the apparatus in electrical insulating material.

Many modifications of the apparatus described will be apparent to those skilled in the art without departing form the spirit and scope of the invention. For instance although it has not been specifically described and may be inconvenient in some respects the cable may be severed by the direct action of the exploding charge without the need for a cutting element to be projected. The guide rods 8 and 9 could of course be hollow tubes, or alternatively be replaced by taut wires.

We claim:

1. A device for severing a substantially horizontal line responsive to relative bodily movement between the device and the line, said device comprising, in combination means forming cutting zone; guide means operable to guide a line into said cutting zone; trigger means actuable responsive to movement of a line into said cutting zone; severing means operatively associated with said trigger means and operable, responsive to actuation of said trigger means, to sever the line in said cutting zone; and delay means operatively associated with said trigger means and said severing means and operable to delay operation of said severing means for a predetermined period following actuation of said trigger means to sever a line entering into said cutting zone.

2. A device as claimed in claim 1, in which said predetermined period is of the order of 0.15 seconds.

3. A device as claimed in claim 1, wherein said guide means includes a pair of guides which are convergent towards said cutting zone such that a line, on contact with one of said guides, will slide therealong into said cutting zone.

4. A device as claimed in claim 3, wherein said guides are formed as edges of a pair of coplanar plate portions.

5. A device for severing a line, as claimed in claim 1, in which said severing means comprises a barrel, a charge of explosive material in said barrel initiated responsive to actuation of said trigger means, and a cutting element mounted within said barrel; said cutting element being accelerated toward the line in said cutting zone, responsive to initiation of said charge of explosive material, to sever the line.

6. A device as claimed in claim 5, wherein said guide means includes a pair of guides which are convergent toward said cutting zone such that a line, on contact with one of said guides, will slide therealong into said cutting zone; said guides being formed as edges of a pair of coplanar plate portions; said barrel being mounted on one of said plate portions, and the other of said plate portions carrying an anvil serving as a reaction surface for said cutting element, to facilitate severing of the line.

7. A device as claimed in claim 5, wherein said trigger means includes a percussion initiated charge, a striker pin and a latch, said pin being coupled to the latch, said latch being displaced on entry of a line into said zone to release the pin therefrom enabling the striker pin to initiate said percussion initiated charge.

8. A device as claimed in claim 7, wherein said cutting element includes a recess for housing said explosive charge, said percussion ignitable charge and said striker pin.

9. A device as claimed in claim 8, wherein said striker pin is encircled by a normally un-compressed compression spring, and said latch is so shaped to as to move the striker pin away from the percussion initiated charge to thereby compress the compression spring prior to release of said striker pin by the latch, whereby said compression spring resiliently urges, said striker pin to impact the percussion initiated charge after release of the striker pin.

* * * * *